United States Patent [19]

Paytas

[11] Patent Number: 4,987,729

[45] Date of Patent: Jan. 29, 1991

[54] SOLAR POWERED MOWER

[76] Inventor: Anthony R. Paytas, 28177 Palomino, Warren, Mich. 48093

[21] Appl. No.: 506,903

[22] Filed: Apr. 10, 1990

[51] Int. Cl.[5] ....................... A01D 34/10; A01D 69/02

[52] U.S. Cl. ....................................... 56/11.9; 56/10.6; 136/291; 320/61

[58] Field of Search ........................... 56/11.9, 1, 10.6; 136/291; 180/2.2, 65.3; 320/2, 61

[56] References Cited

U.S. PATENT DOCUMENTS

| | | | |
|---|---|---|---|
| 3,212,244 | 10/1965 | Wilgus | 56/11.9 X |
| 4,141,425 | 2/1979 | Treat | 180/65.3 X |
| 4,516,647 | 5/1985 | Novak | 180/65.3 X |
| 4,592,436 | 6/1986 | Tomei | 136/291 X |
| 4,882,896 | 11/1989 | Wilcox | 56/11.9 X |
| 4,942,723 | 7/1990 | Wassell | 56/10.6 |

*Primary Examiner*—Ramon S. Britts
*Assistant Examiner*—David J. Bagnell
*Attorney, Agent, or Firm*—John C. Evans

[57] ABSTRACT

A powered mower has a cordless electric power source defined by a rechargeable battery and a solar panel. The rechargeable battery is connected to a direct current motor for driving the mower blade and drive system for the powered mower. The solar panel supplies the rechargeable battery with additional voltage and current to assist the battery in maintaining its functional operating level.

4 Claims, 3 Drawing Sheets

26a
26
26a
28a
28b
28
80
62
24
30
10
64
20
66
22
60
12a
12
38
40
44
48
46
42
36
18
32
34
20a
16
14

SOLAR POWERED MOWER

FIELD OF THE INVENTION

This invention relates to power mowers and more particularly to power mowers powered by electrical motors.

BACKGROUND OF THE INVENTION

Present day power mowers can be powered either by a 4-cycle gasoline engine or a 2-cycle gasoline engine for providing power to drive a cutting blade of either the rotary or reel type. Other power mowers have an electric motor that drives a cutting blade of either type the rotary or reel type. Such electric motor powered mowers have the power supply provided to the motor through an extensible cord which connects to a standard domestic power supply.

The use of gasoline engine constitutes a substantial source of air pollution which in time could become regulated by the E.P.A. as are larger engines for powering automobiles and other motor vehicles. The alternative to such gasoline engines is a cord type electric motor driven mower. Such mowers, however, are not as mobile as gasoline engine mowers in that they must be connected to a power supply by a cord during their operation. Such power cords are susceptible to being cut by the blade to produce exposed power leads. Additionally, while not a direct polluter, such electric powered mowers are powered from a central power plant which, if fossil fuel fired, can be a significant source of pollutants unless suitable waste recovery systems are incorporated in the central system.

SUMMARY OF THE INVENTION

Accordingly, a feature of the present invention is to provide a powered mower with a power supply that has little or no emissions therefrom.

Another feature of the present invention is to provide an electrically powered mower with a power supply that does not require a cord for supplying electrical power thereto.

Another feature of the present invention is to provide a powered mower with a rotary blade driven by an electrical drive motor which is connected to a cordless source of power including a primary power source for providing electrical power to the drive motor and further including a secondary source of power that generates power solely on exposure to light energy.

Still another feature is to provide powered mowers of the type set forth in the preceding objects wherein the source of power includes a cordless power supply for an electric drive motor located on the upper surface of a protective housing; the cordless power supply including a primary source of electrical power for driving the electric motor and further including a secondary source of electrical power for charging the primary source of electrical power as power is supplied from said primary source of electrical power to the electric drive motor.

Yet another object of the present invention is to provide an electric power mower having a solar panel with solar cells thereon for charging onboard batteries which supply primary power to the electric motor of the electrically powered mower so as to eliminate the need for a power cord.

Still another object of the present invention is to provide a power mower with a rotary blade driven by an electric motor having a primary source of power defined by rechargeable batteries mounted on the mower and including a secondary source of power mounted on the mower for charging the rechargeable batteries as they supply power to the drive motor.

Other objects of the present invention is to provide power mowers of the preceding object wherein the secondary power source is a solar panel located in overlying relationship to the drive motor in a pattern to intercept sunlight from different directions as the mower is driven in a cutting pattern across a lawn surface.

These and other features, advantages and objects of the present invention will become more apparent in view of the accompanying written description of a preferred embodiment of the invention when taken in conjunction with the appended drawings wherein:

DESCRIPTION OF A PREFERRED EMBODIMENT

Figures 1, 5:
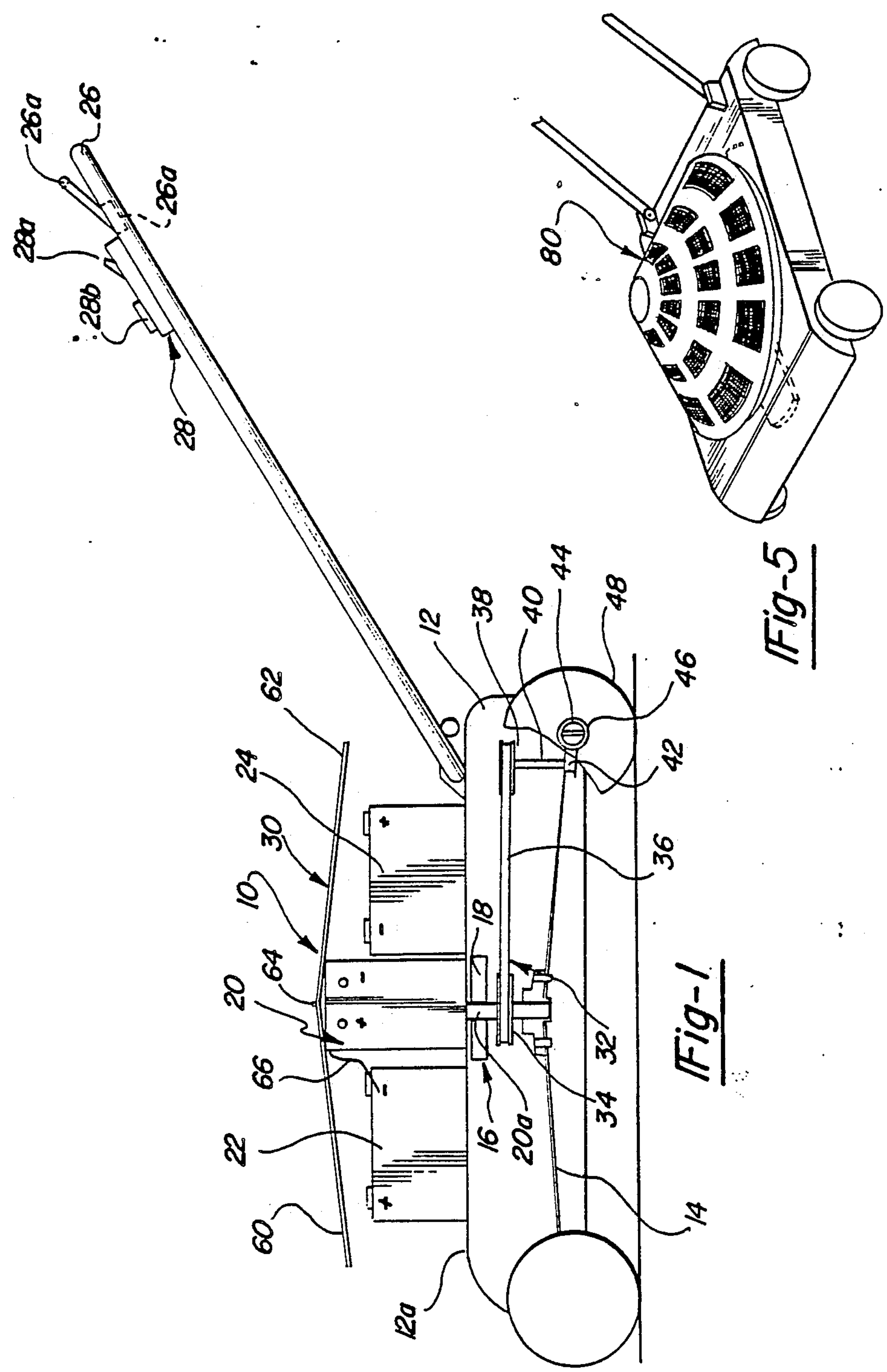
FIG. 1 is a side view of a power mower of the present invention.
FIG. 5 is a top elevational view of another embodiment of a solar panel for use with the present invention.

Referring now to FIG. 1, a powered mower 10 is illustrated including a protective housing 12 for a rotary blade 14. The blade 14 is suspended within the protective housing 12 by a drive train 16 including an electric clutch and brake unit 18. The drive train 16 is connected to a direct current energized electric drive motor 20 by the drive shaft **20*a* of the drive motor. The motor 20 is supported on the top 12*a* of the protective housing 12**.

The powered mower 10 is powered by a primary source of power in the form of rechargeable batteries 22, 24 located on either side of the drive motor 20 where they are secured by suitable hold down fixtures (not shown) to the top **12*a* of the protective housing 12**.

One feature of the present invention is that the provision of an onboard source of power for the drive motor 20 eliminates the need for power cords as presently found on electrically powered mowers. The present invention thereby obviates the attendant problem of accidental cutting of power cords during mower operation.

Another feature of the present invention is the provision of a solar cell system 30 for charging the batteries during mower operation to maintain the rechargeable batteries 22, 24 at a functional operating level. The provision of an onboard recharging source eliminates the need to connect the batteries for recharging from a central power source so as to eliminate power plant emissions which can be generated during such recharging. Initial charging will be necessary as may be periodic charging due to some loss from sitting, unless the mower is left in the sunlight after use until the next mowing. A further advantage of electric powered mowers is that they eliminate pollutants and emissions produced by mowers of the type powered by either four or two cycle engines fueled by existing sources of fossil fuel. Such fossil fueled, internal combustion engines do not include emission control systems and in the aggregate produce combustion products that constitute a substantial source of nitrous oxides, carbon monoxide, carbon dioxide, as well as direct evaporation of the fuel supply all requiring regulation in order to protect the world environment.

A powered mower 10 having the aforesaid rechargeable batteries 22, 24 and solar cell charging system 30 is readily adaptable for use with known drive systems. For example, the powered mower 10 can have a conventional handle 26 with a control module 28 for setting the control modes to operate a standard drive transmission 32 having either a pulley 34 or a gear on the drive shaft **20*a*. A drive belt 36 from the pulley 34 passes over a driven pulley 38. The driven pulley 38 can connect to a shaft 40 carrying a worm gear 42 that engages a worm 44 on the shaft 46 of a drive wheel 48. Such a drive transmission or its equivalent can be used to turn the wheel (or wheels) of the powered mower 10 allowing the power from the onboard electrical power source to pull the mower over grass terrain to allow the rotating blade 14** to cut the individual blades of grass in a known manner.

Figure 2:
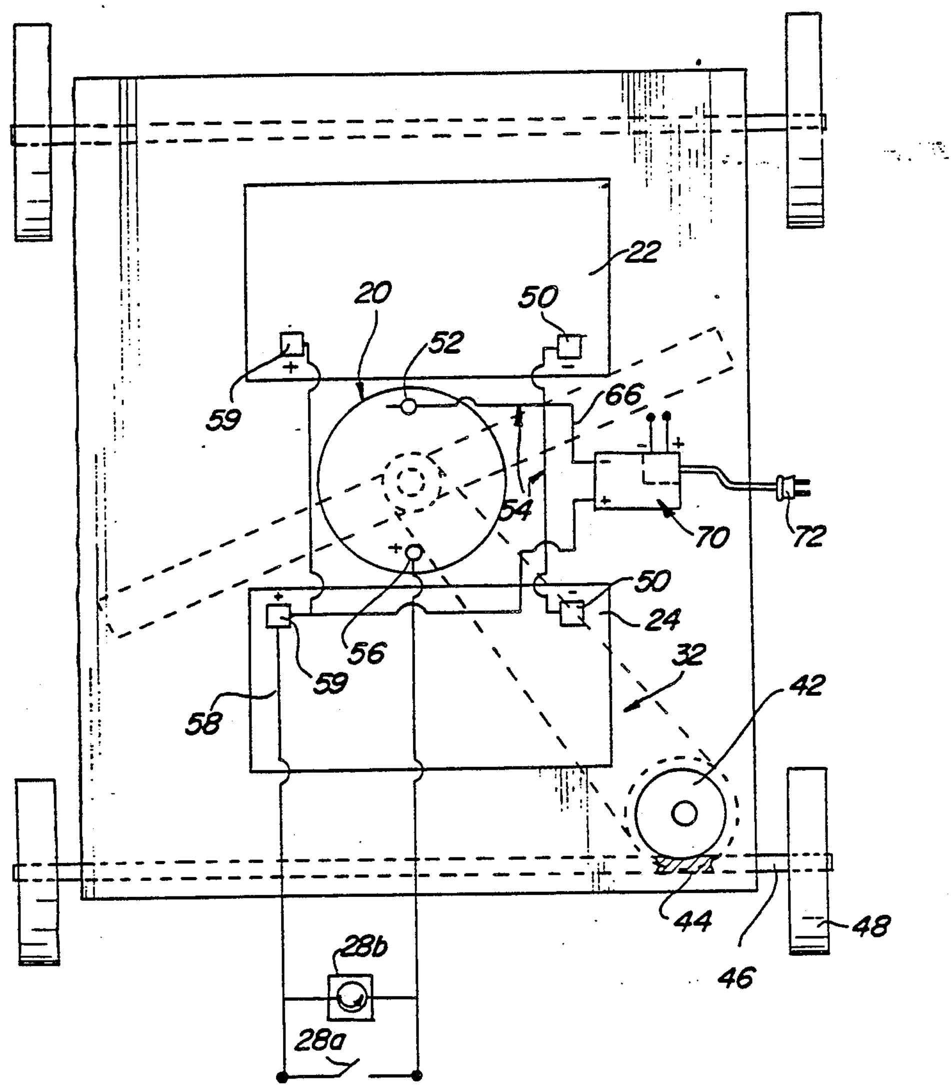
FIG. 2 is an enlarged top elevational view of the power mower of FIG. 1 with a solar panel thereof removed.
Figure 3:
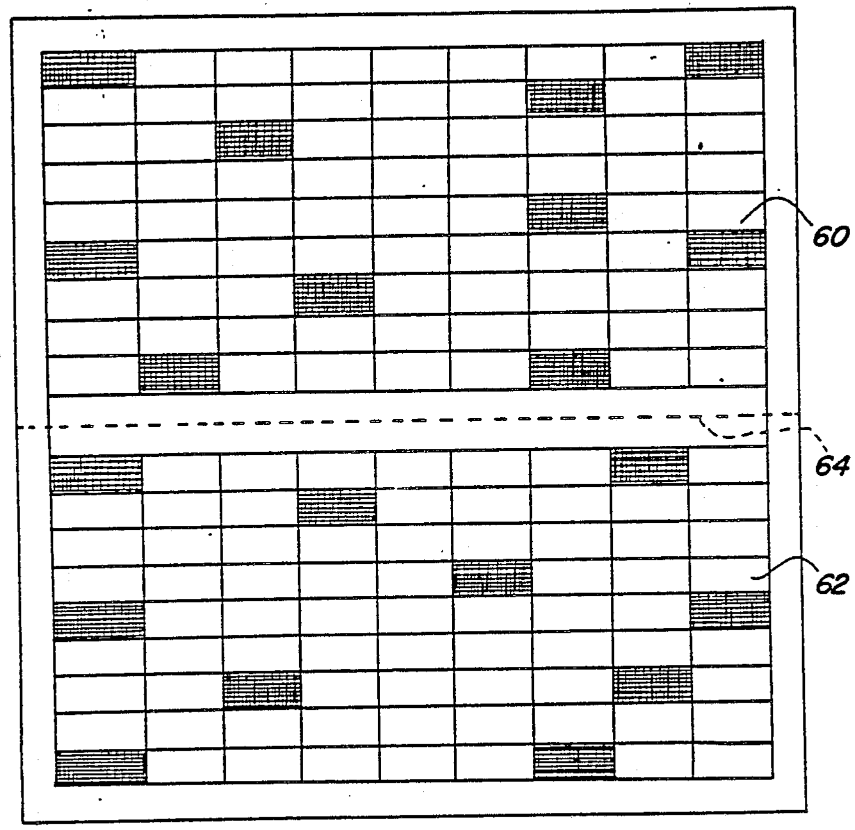
FIG. 3 is a top elevational view of the solar panel of the present invention.
Figure 4:
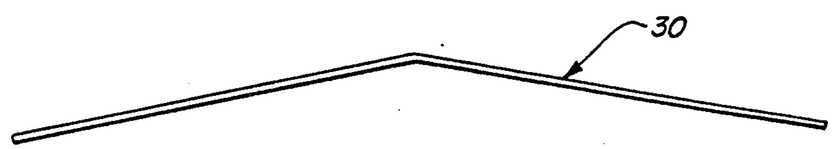
FIG. 4 is a side elevational view of the solar panel of FIG. 3.

In the illustrated arrangement and as best shown in FIG. 2, the rechargeable batteries 22, 24 have negative terminals 50 thereof connected to the negative terminal 52 of the D.C. drive motor 20 by suitable leads 54. Likewise the positive terminal 56 of the motor 20 is connected to either an on-off switch **28*a* on the control module 28 or to a variable speed control 28*b* thereon. When the switch 28*a* is turned on the power circuit is completed across the windings of the D.C. electric drive motor 20 through suitable leads 58 connected to the positive terminals 59 of the batteries 22, 24**.

If a variable speed control **28*b* is used, the electronic speed control can produce a known pulse width modulated signal to the windings of the drive motor 20 to vary the r.p.m. of the drive motor 20 to control the cutting speed of the blade 14 alone. If a transmission 32 is used to propel a drive wheel 48, the speed of the entire unit can be varied by varying the output speed of the drive motor 20**.

The electric clutch 16 can serve as an electric brake by directing opposite polarity power thereto when a handle safety bar **26*a* is released. If the user's hands are removed from the handle 26 the safety release bar 26*a* conditions a safety switch 26*b* to condition the clutch 16 to instantaneously provide a stop action for the cutting blade 14. The clutch 16 also absorbs shock if the blade 14** strikes an object.

As a further safety feature, the onboard powered electric motor 20 of the present invention can be instantly stopped by utilizing the safety switch **26*b* to reverse the battery polarity to the electric motor 20 when it is turning the blade 14 in its normal cutting direction. When the motor stops the switch 26*b* disconnects the motor 20 from the batteries 22, 24 until the switch 26*b* is reset to a starting mode. Alternatively, an electromechanical brake band can be provided to apply emergency braking directly to a rotating clutch or drum assembly connected to the drive shaft 20*a*.**

In operation, the storage cells or batteries 22, 24 are either dry charged or sealed units which are installed on the mower as precharged units from the manufacturer. If required the batteries 22, 24 can receive their initial charge of power from an external charging source. Once charged, however, the batteries 22, 24 can be operated for extended periods of time by utilizing the solar cell system 30 as a supplemental power source to maintain the initial charge on the primary source of power defined by the batteries 22, 24.

The solar cell system 30, more particularly, includes a pair of solar panels 60, 62 joined at a ridge line 64 at a point raised above the top of the electric drive motor 20. The solar panels 60, 62 each have a plurality of solar cells connected so as to produce a voltage and current supply on a lead line 66 which is generated as direct current and voltage when the cells are exposed to either the sun or to a bright light source. A voltage regulator 70 is connected either to a charging outlet 72 for the initial charge or to the lead line 66 to control the current flow with respect to the batteries 22, 24. The voltage regulator 70 is operative to maintain a safe charging level of voltage and current as additional voltage and current is directed from the solar cell system 30 to the batteries to maintain them at a functional operating level.

In the embodiment of the invention in FIG. 5, the solar panels 60, 62 are replaced by a generally conically configured solar panel 80. In both the case of the solar panel 60, 62 and the conically configured solar panel 80, the solar cell system 30 is operative to intercept sun rays from a plurality of directions during operation of the mower 10 as the mower is passed in different cutting patterns across a lawn surface.

While the invention has been discussed with respect to a powered mower with a handle, its adaptability to other mowers such as small ride mowers should be apparent In such cases the protective housing of the mower is upsized to accommodate a larger number of rechargeable batteries to drive a larger load and likewise a larger support base is provided to accommodate a larger area of solar cells to provide the secondary source of power for charging the batteries.

While representative embodiments of the present invention have been shown and discussed, those skilled in the art will recognize that various changes and modifications may be made within the scope and equivalency range of the present invention.

What is claimed is:

1. A mower for cutting grass including a protective housing for enclosing the plane of rotation of a rotary blade arranged to cut grass blades located below the protective housing and the blade being rotated by a motor on the top of the protective housing and a drive system for connecting the motor in driving relationship with the blade characterized by:

said motor comprising an electric drive motor;

means defining a cordless power supply for said electric drive motor located on the upper surface of said protective housing; said cordless power supply including a primary source of electrical power for driving said motor and a second source of electrical power for charging the primary source of electrical power as power is supplied from said primary source of electrical power to said electric drive motor for operating said rotary blade;

said secondary source of power including a pair of solar panels joined at the ends thereof at a ridge line located above said electric drive motor; each of said solar panels being inclined downward from said apex to capture sun rays from a plurality of directions during operation of the mower.

2. The mower assembly of claim 1, further characterized by said primary source of electrical power comprising rechargeable battery means.

3. A mower for cutting grass including a protective housing for enclosing the plane of rotation of a rotary blade arranged to cut grass blades located below the protective housing and the blade being rotated by a motor on the top of the protective housing and a drive system for connecting the motor in driving relationship with the blade characterized by:

said motor comprising an electric drive motor;

means defining a cordless power supply for said electric drive motor located on the upper surface of said protective housing; said cordless power supply including a primary source of electrical power for driving said motor and a secondary source of electrical power for charging the primary source of electrical power as power is supplied from said primary source of electrical power to said electric drive motor for operating said rotary blade;

said secondary source of power including a conically configured solar panel having an apex located above said electric drive motor and including a maximum diameter substantially equal to the diameter of the mower blade shielded by the protective housing.

4. The mower assembly of claim 3, further characterized by said primary source of electrical power comprising rechargeable battery means.

* * * * *